(12) United States Patent
Jungwirth

(10) Patent No.: US 12,012,998 B2
(45) Date of Patent: Jun. 18, 2024

(54) CLUTCH DEVICE WITH A DOG CLUTCH

(71) Applicant: ZF FRIEDRICHSHAFEN AG, Friedrichshafen (DE)

(72) Inventor: Michael Jungwirth, Hauzenberg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 59 days.

(21) Appl. No.: 17/958,520

(22) Filed: Oct. 3, 2022

(65) Prior Publication Data

US 2023/0103566 A1 Apr. 6, 2023

(30) Foreign Application Priority Data

Oct. 4, 2021 (DE) ...................... 10 2021 211 130.0

(51) Int. Cl.
*F16D 23/06* (2006.01)
(52) U.S. Cl.
CPC ...... *F16D 23/06* (2013.01); *F16D 2023/0631* (2013.01); *F16D 2023/0656* (2013.01)
(58) Field of Classification Search
CPC ............. F16D 23/06; F16D 2023/0631; F16D 2023/0656
USPC ........................................................ 74/339
See application file for complete search history.

(56) References Cited

U.S. PATENT DOCUMENTS

| | | | | |
|---|---|---|---|---|
| 1,935,965 | A * | 11/1933 | Wahlberg | F16D 23/04 74/462 |
| 3,717,019 | A * | 2/1973 | Motz | B21H 5/022 29/893.32 |
| 4,727,968 | A * | 3/1988 | Chana | F16D 23/06 192/108 |
| 5,960,925 | A * | 10/1999 | Helms | F16D 23/025 192/53.1 |
| 6,296,100 | B1 * | 10/2001 | Schetter | F16D 23/06 192/108 |
| 9,427,790 | B2 * | 8/2016 | Menendez-Castanedo | B21K 1/30 |

FOREIGN PATENT DOCUMENTS

| | | |
|---|---|---|
| DE | 19711971 | 9/1998 |
| DE | 19734492 | 3/1999 |
| DE | 10335477 | 2/2005 |
| DE | 102005048893 | 4/2007 |
| DE | 102012205425 | 10/2013 |
| DE | 102017216322 | 3/2019 |

* cited by examiner

Primary Examiner — Ha Dinh Ho
(74) Attorney, Agent, or Firm — Cozen O'Connor

(57) ABSTRACT

Clutch device with a dog clutch having inner toothing of a sliding sleeve which is displaceable as part of the dog clutch between a clutch body and the hub of an idler wheel along the outer teeth of the clutch body and the outer toothing of the hub for coupling and decoupling. The inner toothing of the sliding sleeve can be produced comparatively simply compared to the prior art and results in a reduced installation space.

7 Claims, 3 Drawing Sheets coupled decoupled coupled decoupled coupled decoupled

CLUTCH DEVICE WITH A DOG CLUTCH

BACKGROUND OF INVENTION

1. Field of the Invention

The disclosure is directed to a clutch device formed to connect an idler wheel freely rotating on a shaft of a gear unit to a clutch body connected to the same shaft so as to be fixed with respect to rotation relative to it.

2. Description of Related Art

Dog clutches are known from drive technology. They are often used as shifting clutches in motor vehicle transmissions. A dog clutch of this kind comprises at least one sliding sleeve having an inner toothing, a guide sleeve fixedly connected to a gear shaft and which has an outer toothing, and a clutch body with an outer toothing which is connected to an idler wheel freely rotating on the gear shaft. The sliding sleeve is connected to the guide sleeve via the teeth so as to be fixed with respect to rotation relative to it and can be axially displaced on the guide sleeve. In this way, the inner toothing of the sliding sleeve can be brought into engagement with the outer toothing of the clutch body, and the idler wheel can thus be connected to the guide sleeve or the gear shaft, respectively, so as to be fixed with respect to rotation relative to it.

The use of undercut teeth in connection with dog clutches is also known from the prior art.

DE 10 2012 205 425 A1 discloses a sliding sleeve of a dog clutch in a synchronized manual transmission of a vehicle. The construction and manner of operation of the dog clutch in a synchronized manual transmission of a vehicle are well known and need not be discussed in more detail. The sliding sleeve has an axial inner toothing along which the sliding sleeve is axially displaceable and is mounted on a guide sleeve so as to be fixed with respect to rotation relative to it. The teeth of the inner toothing are divided into two tooth groups. There are tooth groups with narrow teeth and with wide teeth. All of the teeth are pointed at their axial ends. Proceeding from the points of the ends, the wide teeth are provided with undercuts at both tooth flanks. The tooth flanks narrow initially before transitioning in the narrowest region into tooth flanks parallel to axial direction. The undercut terminates following the narrow parallel region and returns again to the original tooth flanks of the wide tooth. The wide teeth are provided for engaging with the clutch body. Similar undercuts are also arranged at the narrow teeth. The undercuts on the narrow teeth are used as lubricant reservoirs in order to improve the lubrication between the guide sleeve and sliding sleeve. The use of undercuts on the wide teeth is not discussed in more detail. The undercuts are produced on every tooth by a milling cutter.

A gear retaining system for the manual transmission of a motor vehicle is known from DE 103 35 477 A1. The manual transmission has dog clutches with synchronizers in which the sliding sleeve is brought into engagement at a clutch body when shifting gears. The synchronized shifting process is described at length in the publication and therefore need not be discussed further. The sliding sleeve has an axial inner toothing which can be slid onto an outer toothing of the clutch body to a certain degree of overlap. The individual teeth of the inner toothing have tooth flanks mainly extending parallel at which the sliding sleeve can be axially displaced on a guide sleeve. In the area of overlap with the clutch body, the tooth flanks of the inner toothing are provided with undercuts (beading) beginning at the axial ends of the teeth. The undercuts can be formed differently. In one construction, the tooth flanks initially extend at an angle in axial direction until the teeth again extend with parallel tooth flanks. Accordingly, an area of the tooth which is slid onto the clutch body has a wedge shape, the wedge having the greatest width at the start of the overlap. As the overlap increases, the width of the teeth decreases. The teeth of the clutch body are wedge-shaped in opposite axial direction such that their tooth flanks in each instance extend parallel to the tooth flanks of the teeth of the sliding sleeve in the area of the undercuts. In the engaged state, when the sliding sleeve engages with the clutch body, the wedge shape of the teeth ensures that the teeth are kept engaged automatically during a transmission of torque and the engaged gear cannot easily be disengaged. The undercuts on the sliding sleeve are produced by a cold forming process in which material is displaced. Accordingly, with respect to material stresses and component deformations, a certain optimizing effort is required as a compromise between the size of the undercut and functionality.

Dog clutches are also used in applications other than manual transmissions for motor vehicles.

A clutch device for connecting an accessory unit (e.g., a secondary electric motor) to a drivetrain is known from practice. This clutch device comprises a shaft for connecting to a drivetrain and has an idler wheel mounted on the shaft for connecting to an accessory unit, the shaft and the idler wheel being connected to one another via a dog clutch. The dog clutch comprises a clutch body fixedly arranged on the shaft and a sliding sleeve communicating with the idler wheel. So that it may be received on the shaft, the idler wheel has an elongated hub which is extended beyond the axial length of the idler wheel on one side. The idler wheel is mounted on the shaft in the area of the elongated hub. The sliding sleeve is received on the outer circumference of the elongated hub so as to be fixed with respect to rotation and axially displaceable relative to it. For this purpose, the elongated hub has an outer toothing and the sliding sleeve has an inner toothing meshing with the outer toothing. In order to connect the idler wheel to the shaft, the sliding sleeve can be displaced over the elongated hub up to the clutch body. The clutch body likewise comprises an outer toothing which can be brought into engagement with the inner toothing of the sliding sleeve so that the idler wheel and shaft can be connected to one another so as to be fixed with respect to relative rotation via the sliding sleeve and the clutch body. If the sliding sleeve is moved back from the clutch body to the idler wheel, the connection is severed. The idler wheel can rotate freely on the shaft so that the accessory unit is completely decoupled from the drivetrain. Drag losses which would otherwise occur as a result of a permanent co-rotation of the accessory unit can be prevented by decoupling the accessory unit.

If it must be ensured in the above-mentioned dog clutch that the sliding sleeve can be securely held on the clutch body also in the possible event of vibrations or other shaking, it is obvious to the person skilled in the art to construct the teeth of the sliding sleeve and of the clutch body in the manner known from DE 103 35 477 A1, for example. When the idler wheel is loaded by a torque, the oppositely directed wedge-shaped undercut of the teeth ensures that the inner toothing of the sliding sleeve is always completely drawn into the outer toothing of the clutch body.

The dog clutches known from DE 103 35 477 A1 are designed for use in manual transmissions. If the person skilled in the art is tasked with optimizing a dog clutch for connecting an accessory unit to a drivetrain or decoupling an accessory unit from a drivetrain, some disadvantages of the dog clutches known from DE 103 35 477 A1 must be overcome.

It is considered disadvantageous that the undercuts introduced on the teeth of the inner toothing of the sliding sleeve have regions, which are not useable for reasons relating to production. Such a region is the axially parallel wedge-shaped narrowing before the undercut terminates and returns to the original width of the toothing. This region cannot be brought into contact with the outer toothing of the clutch body and only serves to widen the dog clutch.

Besides this, such an undercut is relatively uneconomical to produce.

Further, compared with a straight toothing with rectangular base area, the wedge-shaped configuration of the teeth of the clutch body leads to a smaller base area of the teeth. In order to transmit a comparable torque with these teeth, the modulus of the clutch body would have to be reduced or the axial length of the teeth would have to be increased. However, a larger axial length conflicts with the requirement to keep the clutch body as narrow as possible in the interest of a fast shifting time.

SUMMARY OF THE INVENTION

The object of one aspect of the invention is to find a clutch device having a dog clutch which is designed to be more robust and to occupy less installation space.

A further object of one aspect of the invention is to simplify the production of the inner toothing of the sliding sleeve.

One aspect of the invention also has the object of finding a drivetrain with a clutch device with a dog clutch which is designed to be more robust and occupy less installation space.

Lastly, an object of one aspect of the invention is to find a motor vehicle with a drivetrain with a clutch device with a dog clutch which is designed to be more robust and occupy less installation space.

BRIEF DESCRIPTION OF THE DRAWINGS

In the following, the invention will be explained in more detail with reference to the drawings. The drawings show.

DETAILED DESCRIPTION OF THE PRESENTLY PREFERRED EMBODIMENTS

Figure 1:
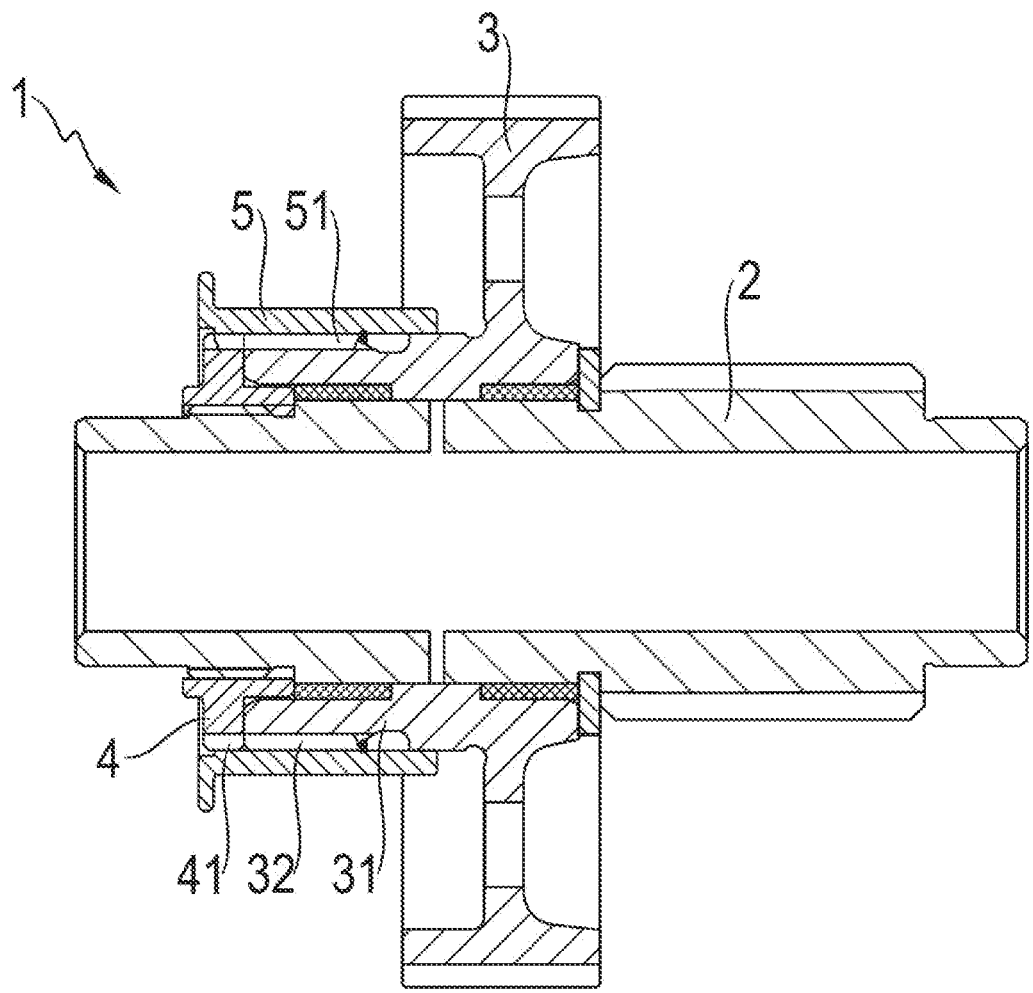
FIG. 1 is a schematic view of a clutch device.

FIG. 1 shows a schematic sectional view of a clutch device having a dog clutch 1. The clutch device has a shaft 2 on which an idler wheel 3 is received. The clutch device is provided for connecting an accessory unit driving the idler wheel 3 to a drivetrain via the shaft 2.

The idler wheel 3 is received at a hub 31 on the shaft 2. The hub 31 is axially elongated to one side of the idler wheel 3 so that a length of the hub 31 is greater than a length of the lateral surface of the idler wheel 3 in axial direction. Rolling element bearings enabling the idler wheel 3 to rotate on the shaft 2 are received in the interior of the hub 31. The hub 31 is provided with an outer toothing 32 in an elongated region projecting in axial direction over the lateral surface.

The dog clutch 1 of the clutch device has a sliding sleeve 5 and a clutch body 4.

The annular clutch body 4 is screwed onto the shaft 2 and is connected to the shaft 2 so as to be fixed with respect to rotation relative to it. In its position, it limits the axial bearing play of the idler wheel 3 and holds the idler wheel 3 on the shaft 2. The clutch body 4 has an outer toothing 41.

The sliding sleeve 5 is arranged on the elongated region of the hub 31. The sliding sleeve 5 is provided with an inner toothing 51 by which it meshes with the outer toothing 32 of the hub 31. The sliding sleeve 5 is accordingly connected to the idler wheel 3 so as to be fixed with respect to rotation relative to it but so as to be axially displaceable along the outer toothing 32 of the idler wheel 3. The axial displacement makes it possible for the sliding sleeve 5 to occupy two distinct positions on the idler wheel 3.

In a first distinct position, as is shown in FIG. 1, the sliding sleeve 5 is slid on axially over the hub 31 to the clutch body 4. In doing so, the sliding sleeve 5 engages with both the outer toothing 32 of the hub 31 and the outer toothing 41 of the clutch body 4. Accordingly, in this position of the sliding sleeve 5, the idler wheel 3 is connected to the shaft 2 so as to be fixed with respect to rotation relative to it and the accessory unit can drive the shaft 2.

In a second distinct position (not shown in FIG. 1), the sliding sleeve 5 is completely slid onto the hub 31 of the idler wheel 3. Accordingly, the inner toothing 51 of the sliding sleeve 5 no longer engages with the outer toothing 41 of the clutch body 4. The idler wheel 3 can rotate freely on the shaft 2 so that the accessory unit is decoupled from the drivetrain.

To this extent, the clutch device corresponds to the features of a clutch device known from the prior art.

Figure 2A:
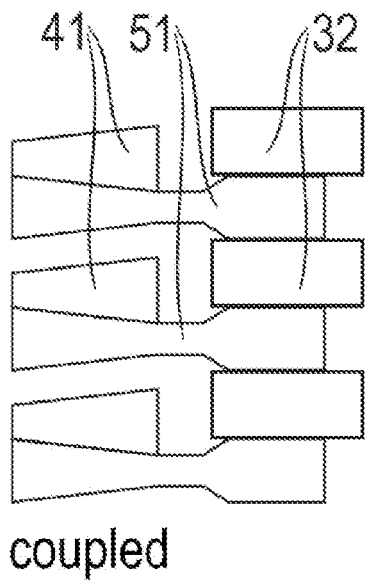
FIGS. 2A-2B is a schematic view of the teeth of clutch body, sliding sleeve and hub of the idler wheel in two positions according to the prior art.
Figure 2B:
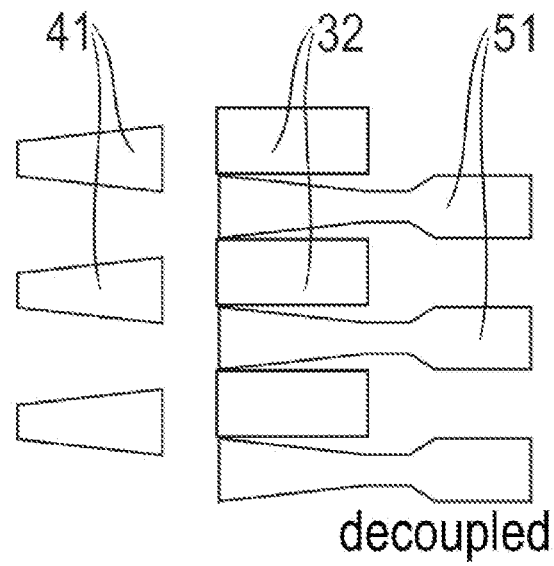

The configuration of the teeth which differs substantially from the prior art shown schematically in FIGS. 2a and 2b is key to the invention. The differences will be illustrated in the following referring to FIGS. 3a and 3b. A simplified view of the outer toothing 32 of the hub 31, the outer toothing 41 of the clutch body 4 and the inner toothing 51 of the sliding sleeve 5 is shown in a perspective developed view in FIGS. 4a and 4b.

The inner toothing 51 of the sliding sleeve 5 is divided into a first portion 53 and a second portion 54. In the first portion 53, the inner toothing 51 of the sliding sleeve 5 is shaped to complement the outer toothing 41 of the clutch body 4. In the second portion 54, the inner toothing 51 of the sliding sleeve 5 is shaped to complement the outer toothing 32 of the idler wheel 3. Correspondingly, the teeth 52 forming the inner toothing 51 of the sliding sleeve 5 have a tooth tip 521 and beveled tooth flanks 522. In the first portion 53, the tooth tip 521 initially extends with a constant width. Proceeding from the width in the first portion 53, the width in the second portion 54 immediately following the first portion 53 decreases linearly.

The lateral tooth flanks 522 are beveled over the length of the tooth in the first region 53 and second region 54.

Figure 3A:
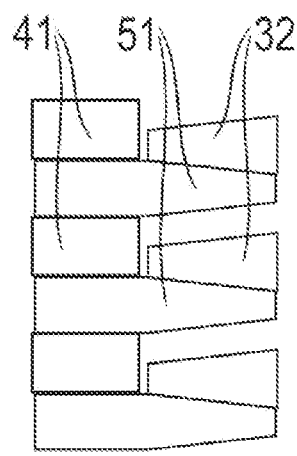
FIGS. 3A-3B is a schematic view of the teeth of the clutch body, sliding sleeve and hub of the idler wheel in two positions.
Figure 4A:
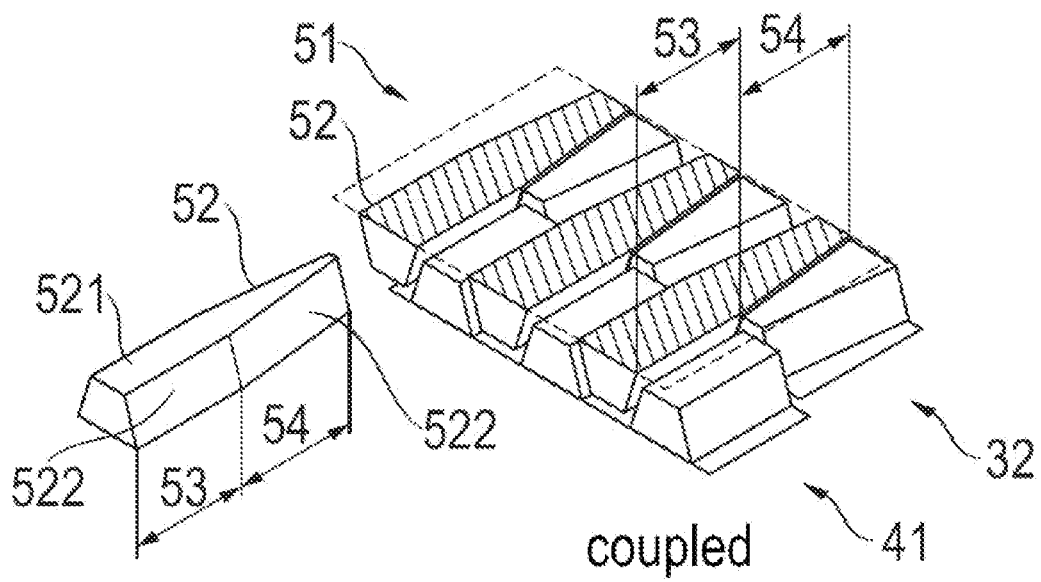
FIGS. 4A-4B is a perspective developed view of the teeth.
Figure 4B:
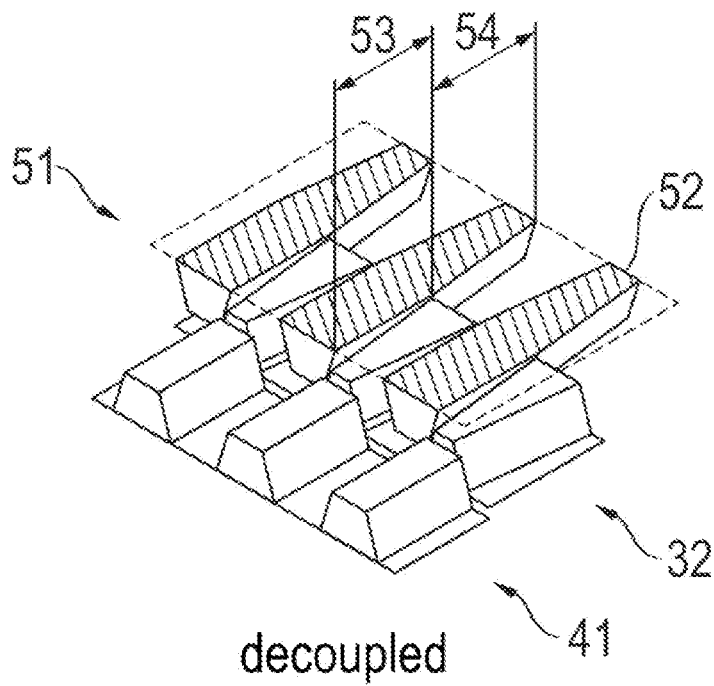

FIG. 3a shows the sliding sleeve 5 in the first position described referring to FIG. 1 in which the idler wheel 3 is connected to (coupled with) the clutch body 4. Every tooth 52 in the first portion 53 with the tooth tip of constant width engages with the outer toothing 41 of the clutch body 4. The outer toothing 41 of the clutch body 4 is formed as a straight toothing in which the individual teeth have axially parallel tooth flanks and a rectangular base area.

In contrast to the prior art shown in FIGS. 2a and 2b in which the outer toothing 41 of the clutch body 4 comprises wedge-shaped teeth, the clutch body 4 can be constructed in this case to be narrower in axial direction with a comparable base area of the teeth. With a narrower clutch body 4, shorter shifting times can be achieved with the dog clutch 1.

The sliding sleeve 5 communicates with the outer toothing 32 of the hub 31 with the second portion 54 of the teeth 52. The outer toothing 32 of the hub 31 is a modified straight toothing in which the tooth flanks of a tooth extend in each instance symmetric to the axis at an angle. The teeth of the outer toothing 32 of the hub 31 are accordingly narrowed in a wedge-shaped manner. A wide front side of the teeth faces the idler wheel 3 and a narrow front side of the teeth faces the clutch body 4.

The beveled tooth flanks 522 of the teeth 52 of the sliding sleeve 5 are adapted with respect to angle to the wedge shape of the outer toothing 32 of the hub 31 in the second portion 54. During a torque transmitted with the dog clutch 1, the opposed wedge shape of the outer toothing 32 of the hub 31 and of the inner toothing 51 of the sliding sleeve 5 in the second portion 54 ensures that the sliding sleeve 5 is always completely slid into the outer toothing 41 of the clutch body 4. This ensures that the sliding sleeve 5 can also be reliably held on the clutch body 4 during vibrations or other shaking which may possibly occur.

Figure 3B:
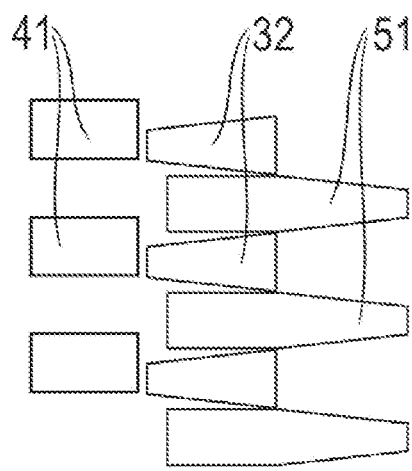

FIG. 3b shows the sliding sleeve 5 in the second position in which the idler wheel 3 is decoupled from the clutch body 4. The inner toothing 51 of the sliding sleeve 5 is completely slid back on the idler wheel 3 so that the idler wheel 3 can move independent from the clutch body 4 or the shaft 2, respectively.

The further advantages achieved with the inventive inner toothing 51 of the sliding sleeve 5 over the prior art will be illustrated in the following. As in the prior art shown in FIGS. 2a and 2b, the teeth 52 of the inner toothing 51 of the sliding sleeve 5 in the first portion 53 have the tooth tip 521 facing the clutch body with the beveled tooth flanks 522 directly adjoining the tooth tip 521. Adjoining the beveled tooth flanks 522 is a runout caused by the manufacturing process for producing the undercuts in which the tooth flanks extend briefly axially parallel before the termination of the undercut and returns again to the original width of the tooth 52 determined by the tooth tip 521. The production-related runouts of undercuts cannot be brought into contact with the clutch body and therefore can also not be used to transmit a torque.

Due to the layout of the wedge-shaped toothing of the clutch body 4 on the hub 31 which is depicted in FIGS. 3a and 3b and FIGS. 4a and 4b, the undercut with the runout that is not usable can be dispensed with. Axial installation space can be gained by shortening the sliding sleeve 5 and positioning the clutch body 4 and idler wheel 3 closer together.

Due to the fact that the tooth flanks 522 have no undercuts, a required production process that is simpler compared to the production of undercuts, e.g., a gear skiving, can also be used.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A clutch device, comprising:
   a shaft configured to connect to a drivetrain;
   an idler wheel mounted on the shaft configured to connect to an accessory unit having a hub with an outer toothing; and
   a dog clutch comprising:
      a clutch body having an outer toothing and arranged on the shaft so as to be fixed with respect to rotation relative to the shaft; and
      a sliding sleeve via which the shaft and the idler wheel communicate with one another and having an inner toothing with which the sliding sleeve is displaceable along the outer toothing of the hub of the idler wheel into the outer toothing of the clutch body;
      wherein a first portion of the inner toothing of the sliding sleeve has a shape which complements the outer toothing of the clutch body and a second portion of the inner toothing has a shape which complements the outer toothing of the hub,
      wherein teeth forming the inner toothing of the sliding sleeve have a tooth tip and beveled tooth flanks adjoining the tooth tip,
      wherein the tooth tip has a constant width in the first portion and a width which decreases linearly proceeding from the first portion in the second portion adjoining the first portion.

2. The clutch device according to claim 1, wherein the clutch body has an end stop for the sliding sleeve.

3. The clutch device according to claim 1, wherein the inner toothing of the sliding sleeve and the outer toothing of the clutch body each have tips at opposite ends.

4. The clutch device according to claim 1, wherein the tooth tip is formed by a plane surface.

5. The clutch device according to claim 1, wherein the tooth tip has a circumferential bevel.

6. A drivetrain of a motor vehicle, wherein the drivetrain comprises a clutch device comprising:
   a shaft configured to connect to a drivetrain;
   an idler wheel mounted on the shaft configured to connect to an accessory unit having a hub with an outer toothing; and
   a dog clutch comprising:
      a clutch body having an outer toothing and arranged on the shaft so as to be fixed with respect to rotation relative to the shaft; and
      a sliding sleeve via which the shaft and the idler wheel communicate with one another and having an inner toothing with which the sliding sleeve is displaceable along the outer toothing of the hub of the idler wheel into the outer toothing of the clutch body;
      wherein a first portion of the inner toothing of the sliding sleeve has a shape which complements the outer toothing of the clutch body and a second portion of the inner toothing has a shape which complements the outer toothing of the hub, wherein teeth forming the inner toothing of the sliding sleeve have a tooth tip and beveled tooth flanks adjoining the tooth tip, wherein the tooth tip has a constant width in the first portion and a width which decreases linearly proceeding from the first portion in the second portion adjoining the first portion.

7. A motor vehicle, wherein it comprises a drivetrain comprises a clutch device comprising:

a shaft configured to connect to a drivetrain;

an idler wheel mounted on the shaft configured to connect to an accessory unit having a hub with an outer toothing; and a dog clutch comprising:

a clutch body having an outer toothing and arranged on the shaft so as to be fixed with respect to rotation relative to the shaft; and a sliding sleeve via which the shaft and the idler wheel communicate with one another and having an inner toothing with which the sliding sleeve is displaceable along the outer toothing of the hub of the idler wheel into the outer toothing of the clutch body;

wherein a first portion of the inner toothing of the sliding sleeve has a shape which complements the outer toothing of the clutch body and a second portion of the inner toothing has a shape which complements the outer toothing of the hub, wherein teeth forming the inner toothing of the sliding sleeve have a tooth tip and beveled tooth flanks adjoining the tooth tip, wherein the tooth tip has a constant width in the first portion and a width which decreases linearly proceeding from the first portion in the second portion adjoining the first portion.

* * * * *